Feb. 20, 1951     E. W. STACEY ET AL     2,542,217
ARMED MOUNT FOR AIRCRAFT

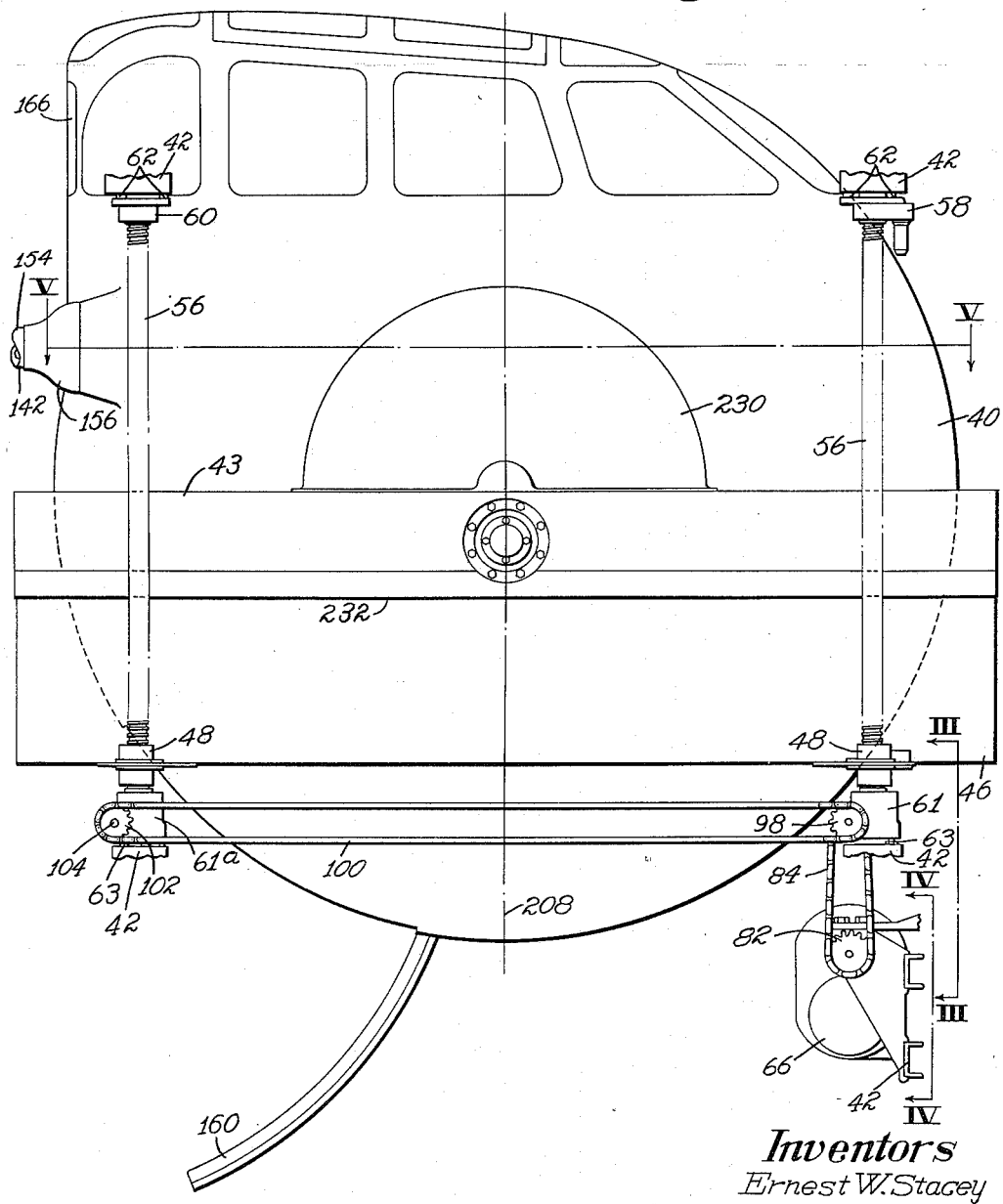

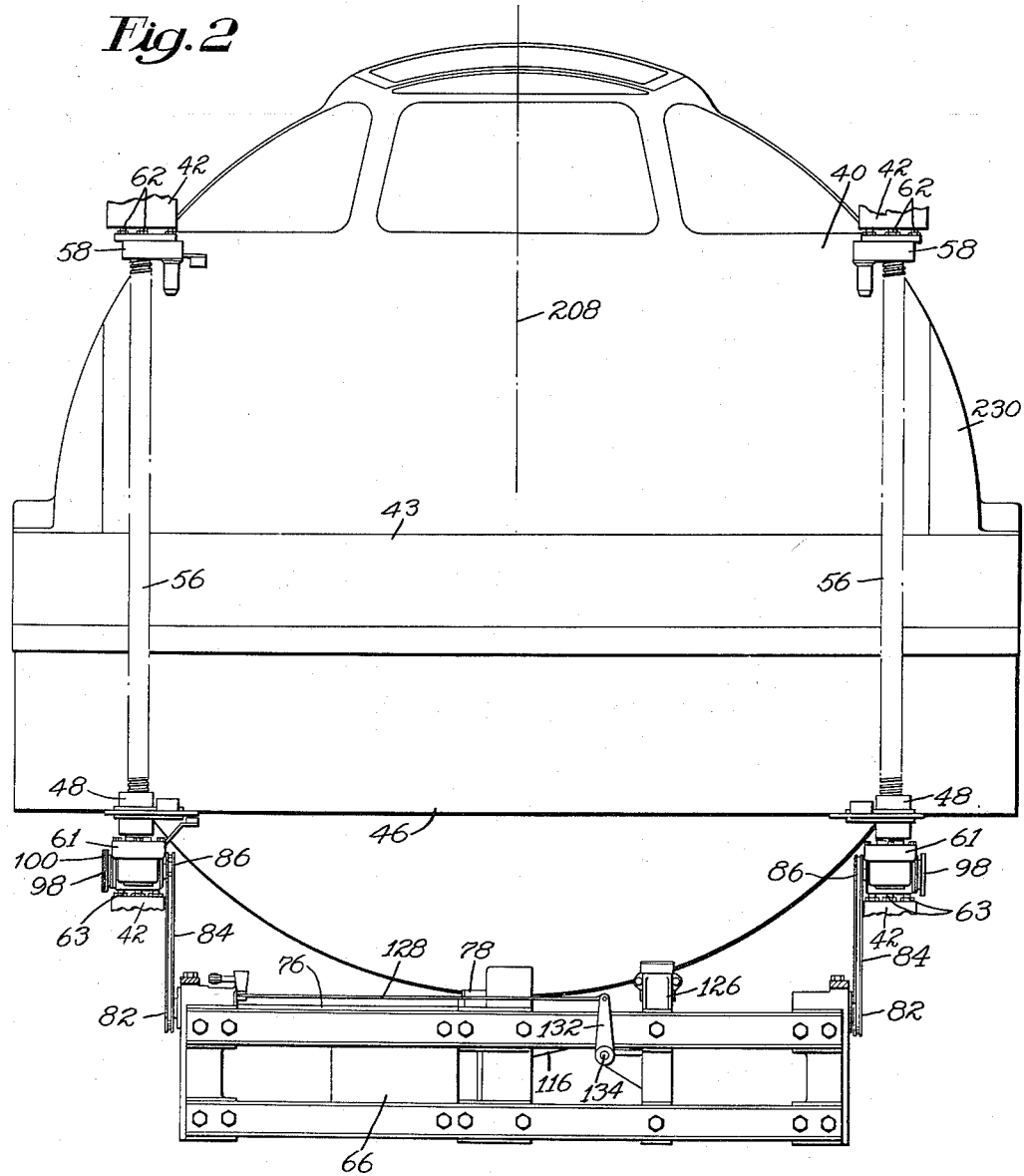

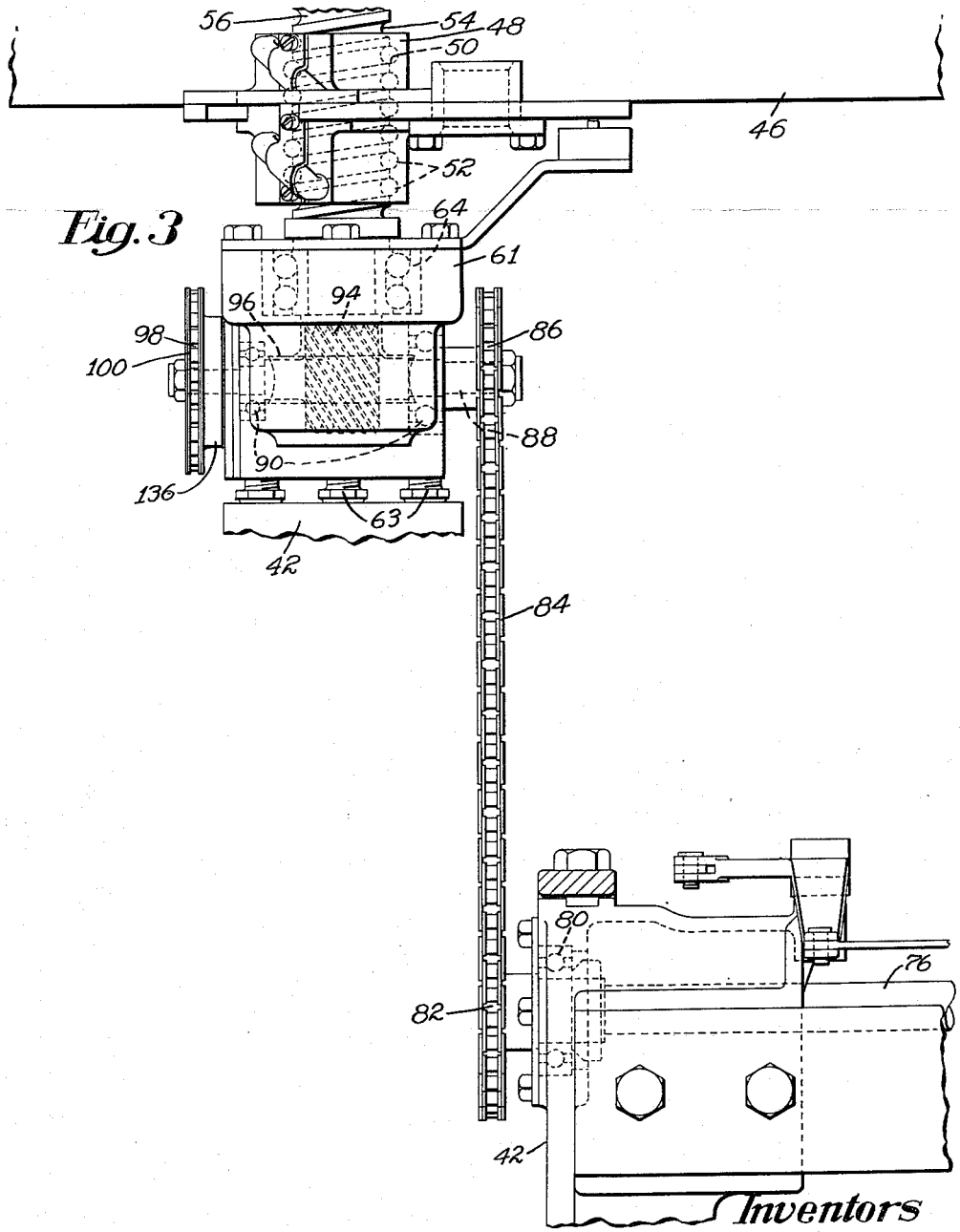

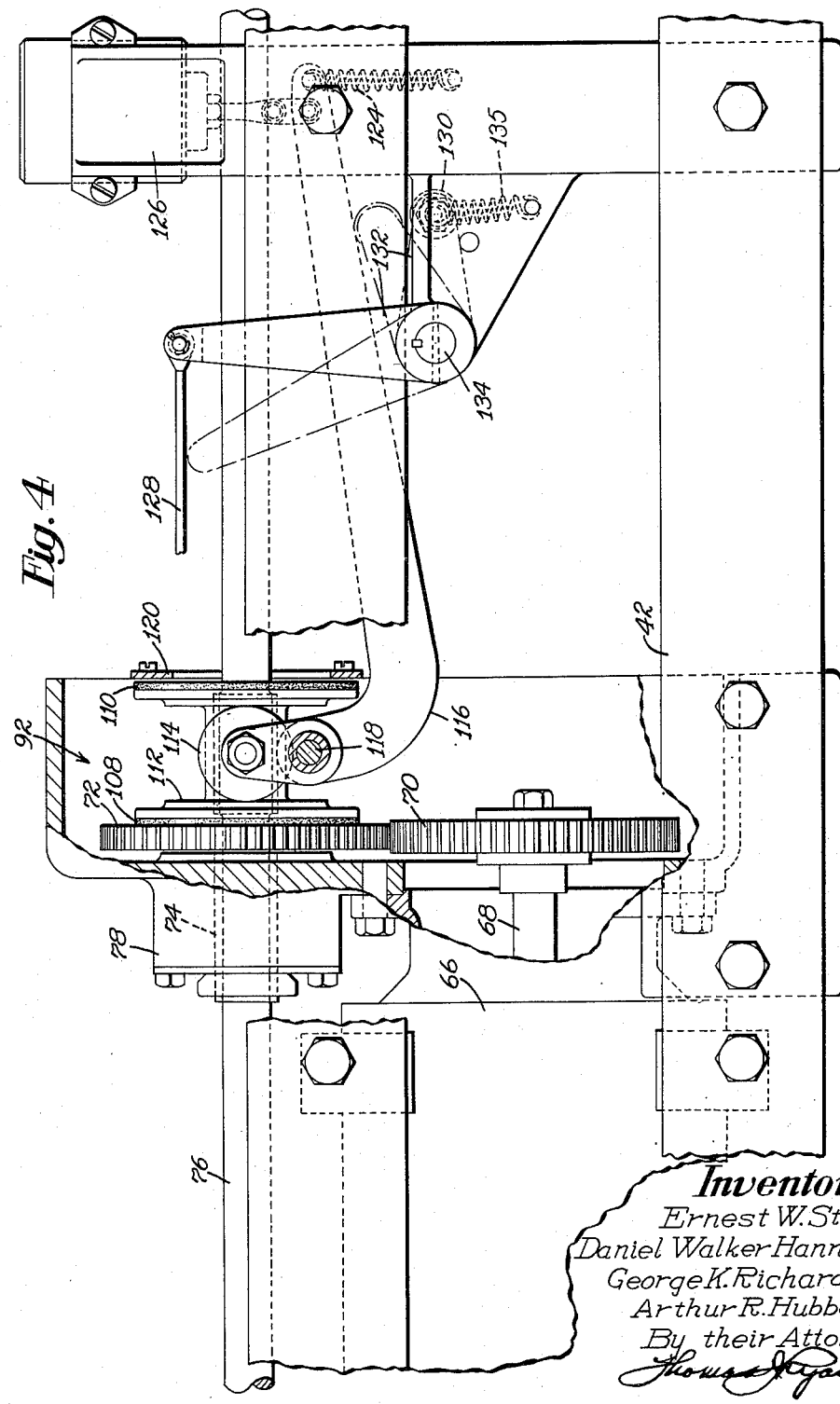

Filed Nov. 1, 1946     15 Sheets—Sheet 5

Inventors
Ernest W. Stacey
Daniel Walker Hannable
George K. Richardson
Arthur R. Hubbard
By their Attorney Inventors
Ernest W. Stacey
Daniel Walker Hannable
George K. Richardson
Arthur R. Hubbard
By their Attorney

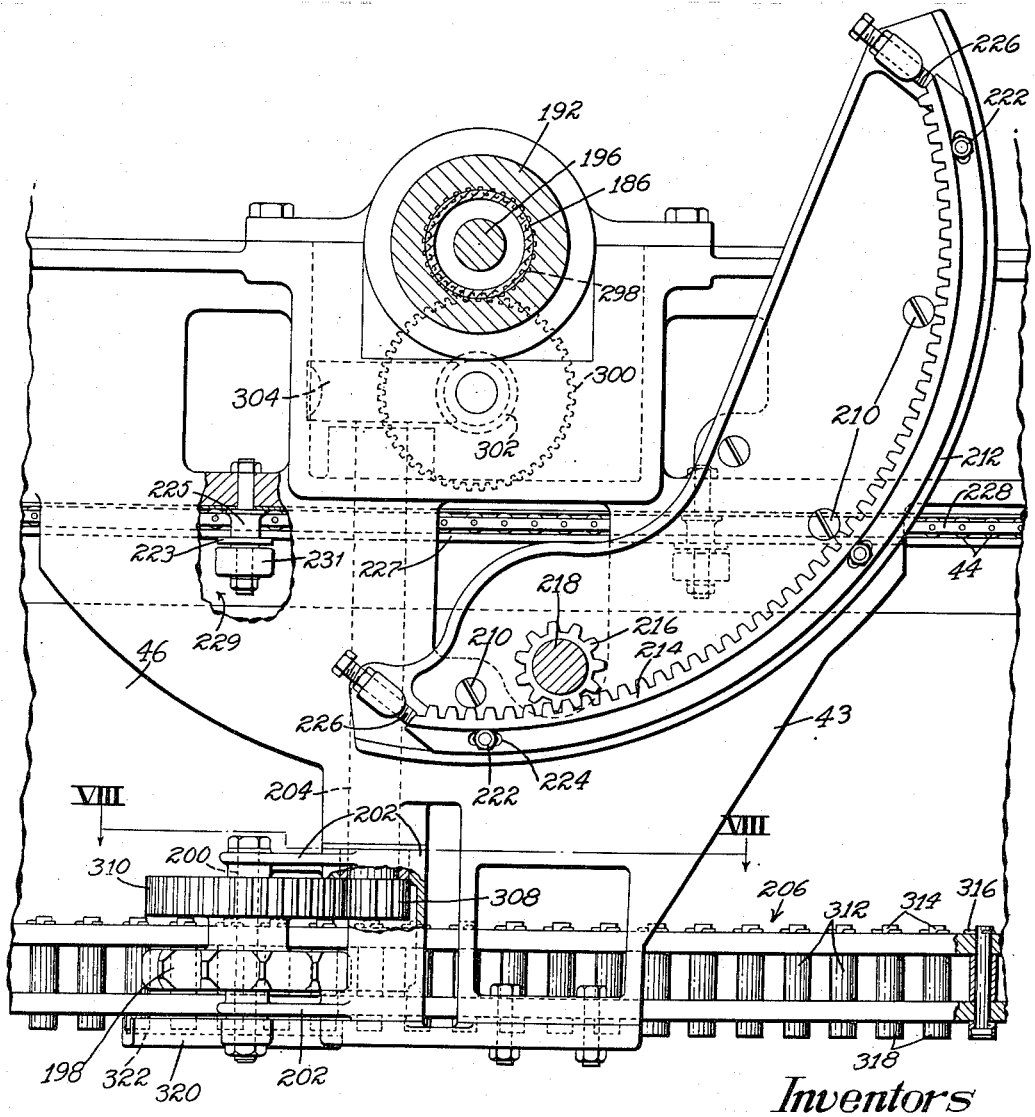

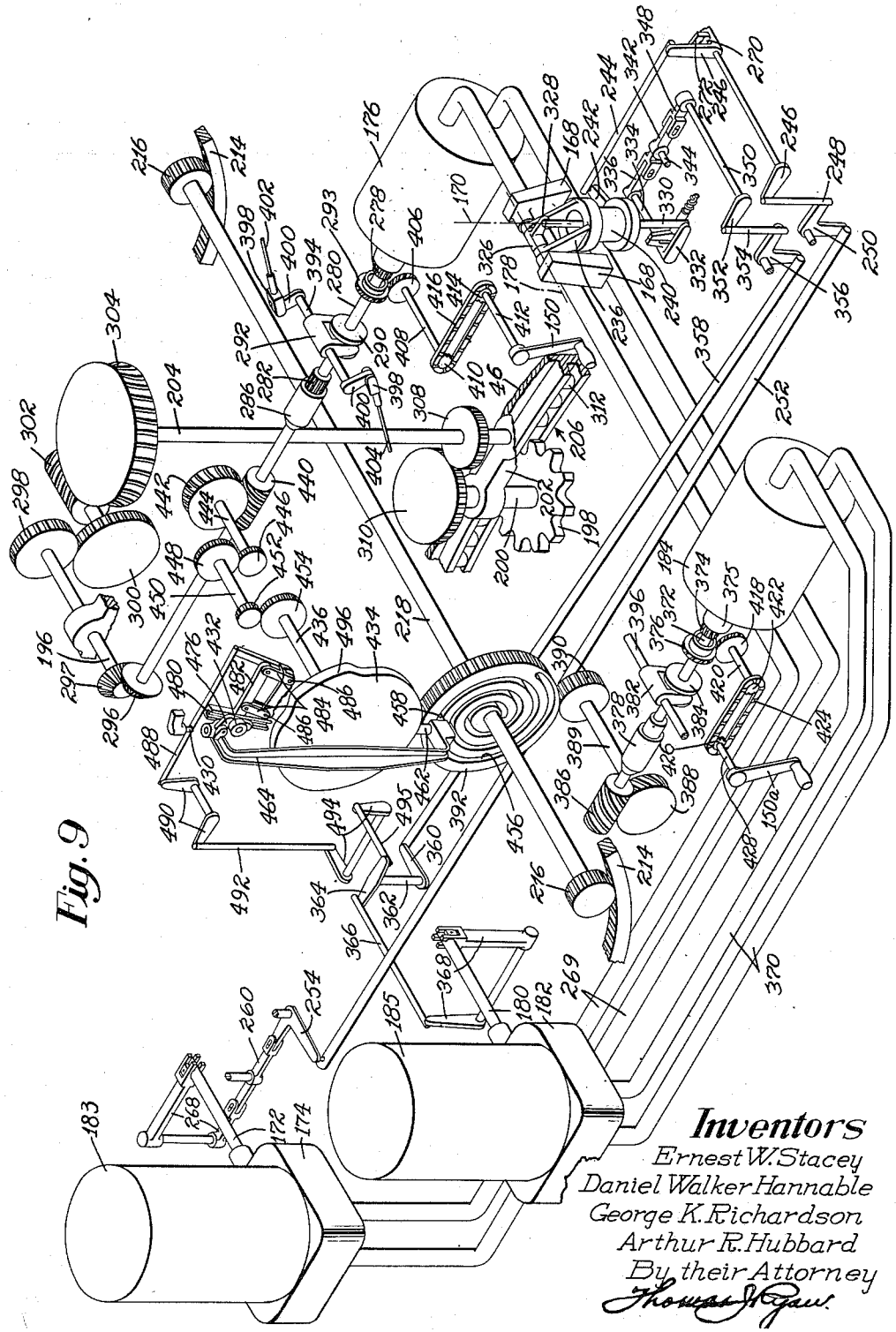

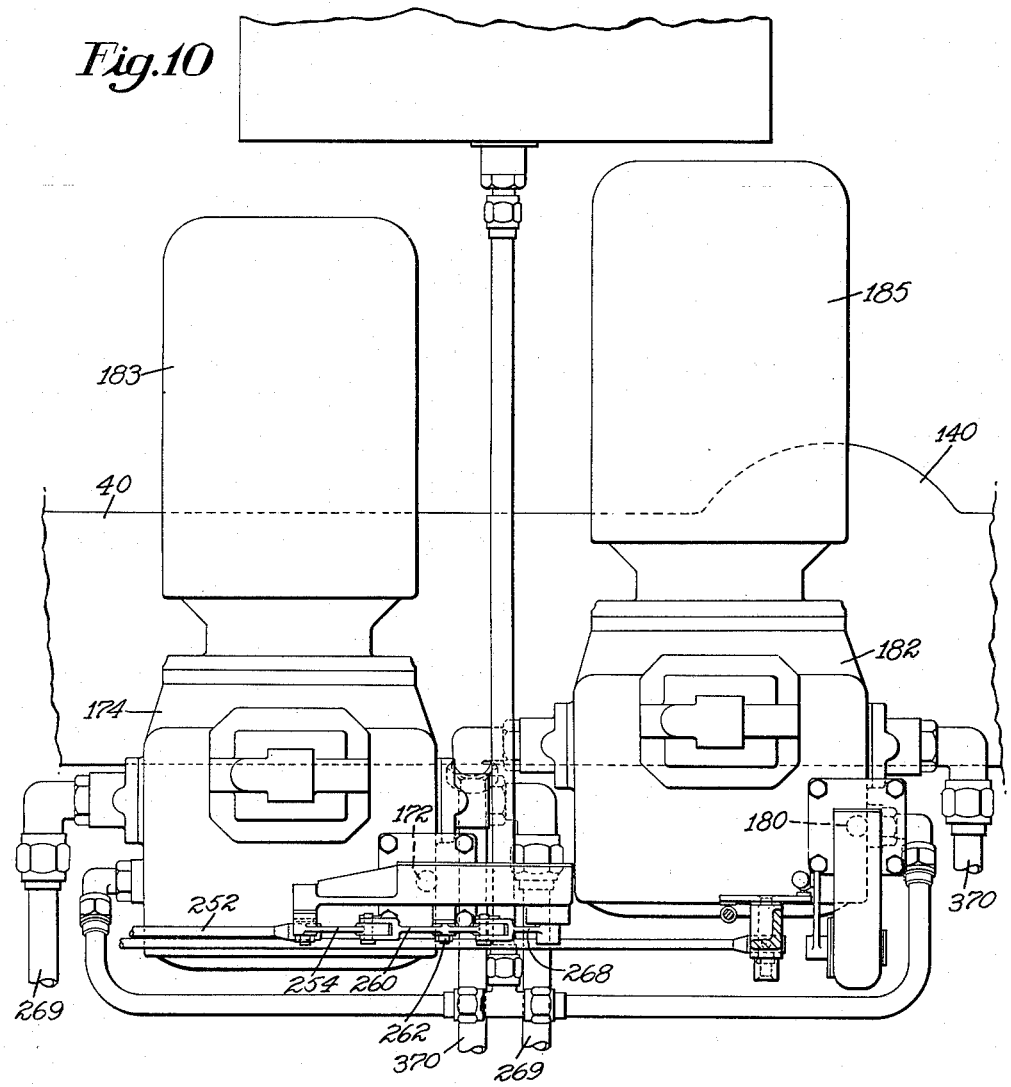

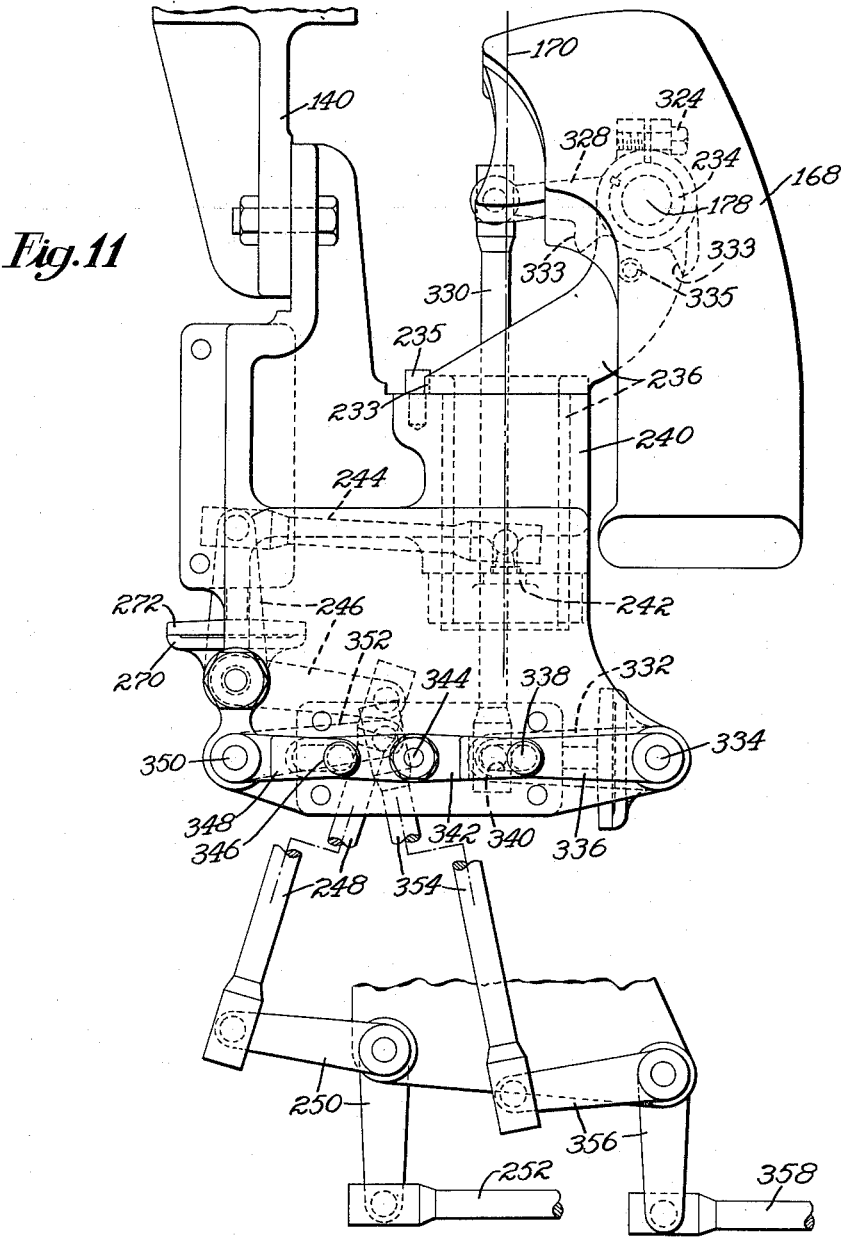

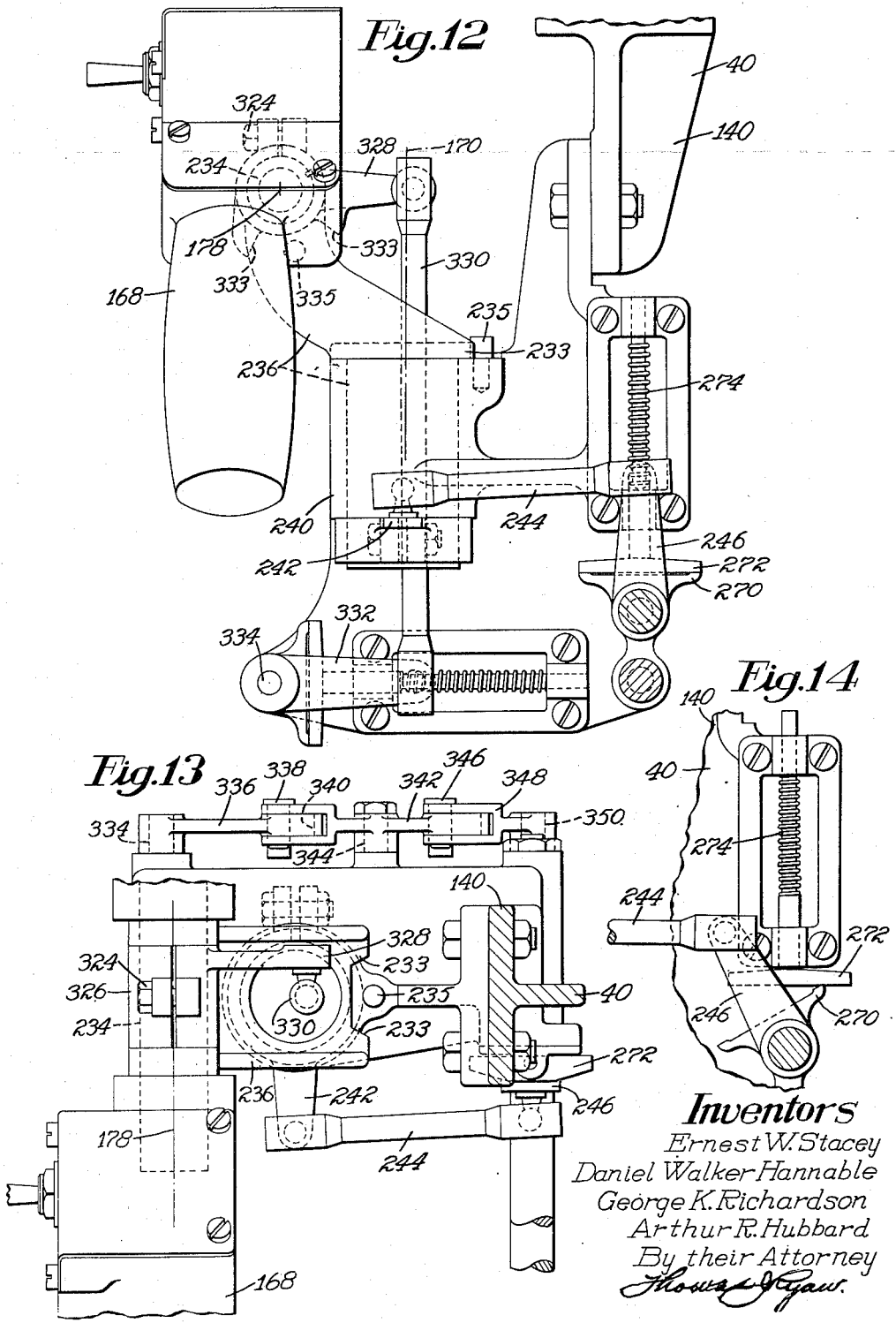

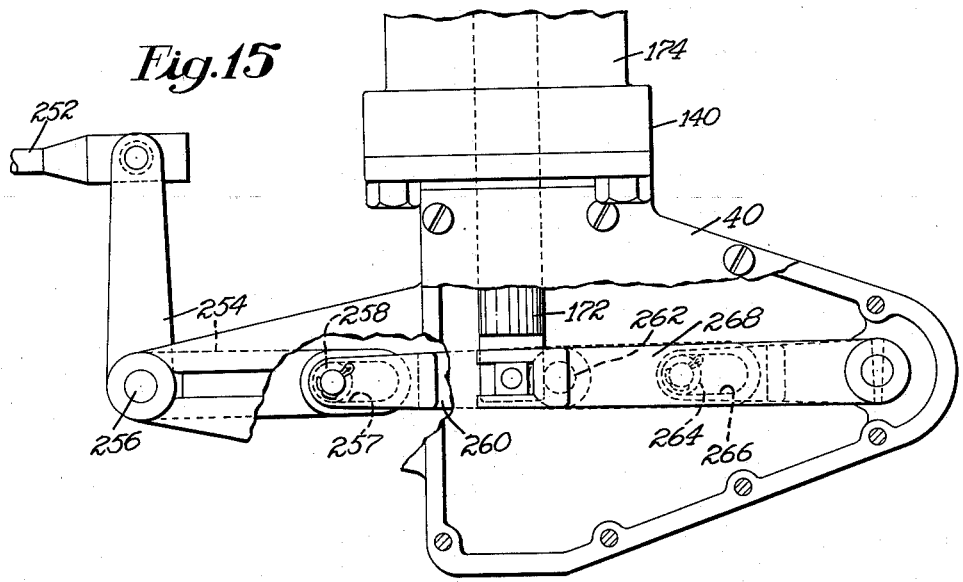
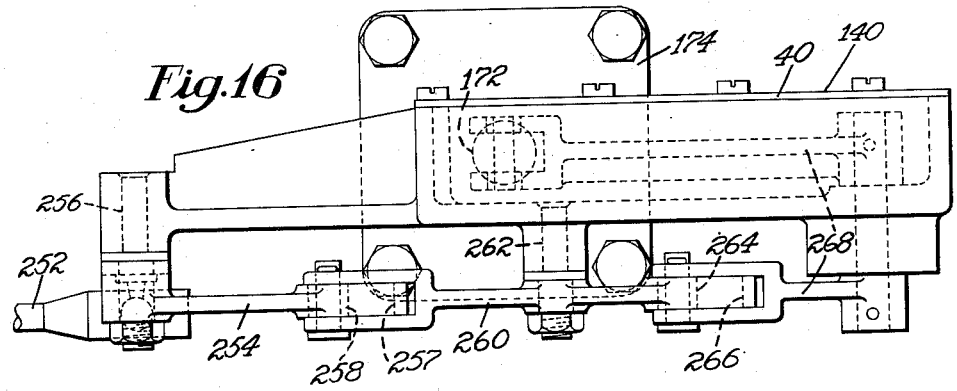

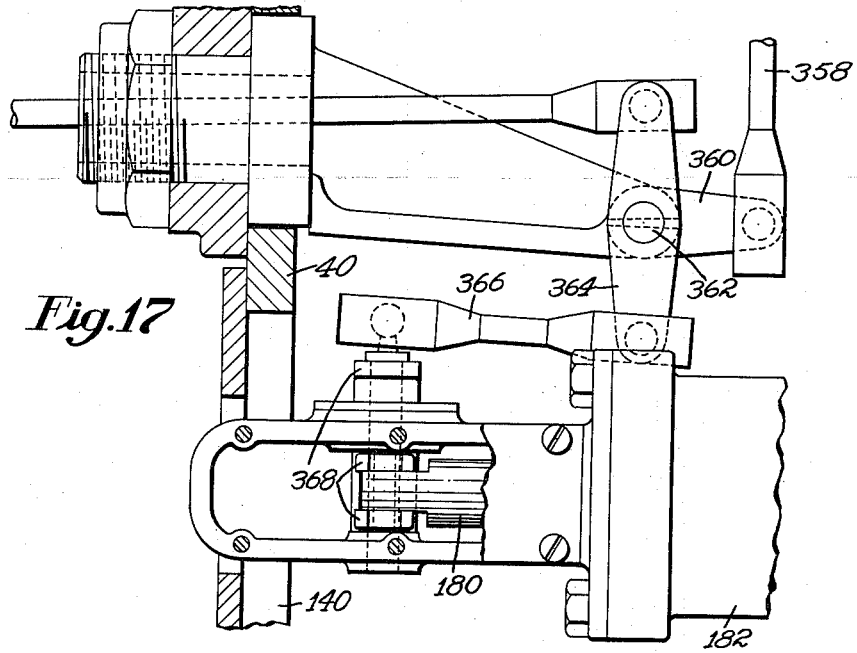
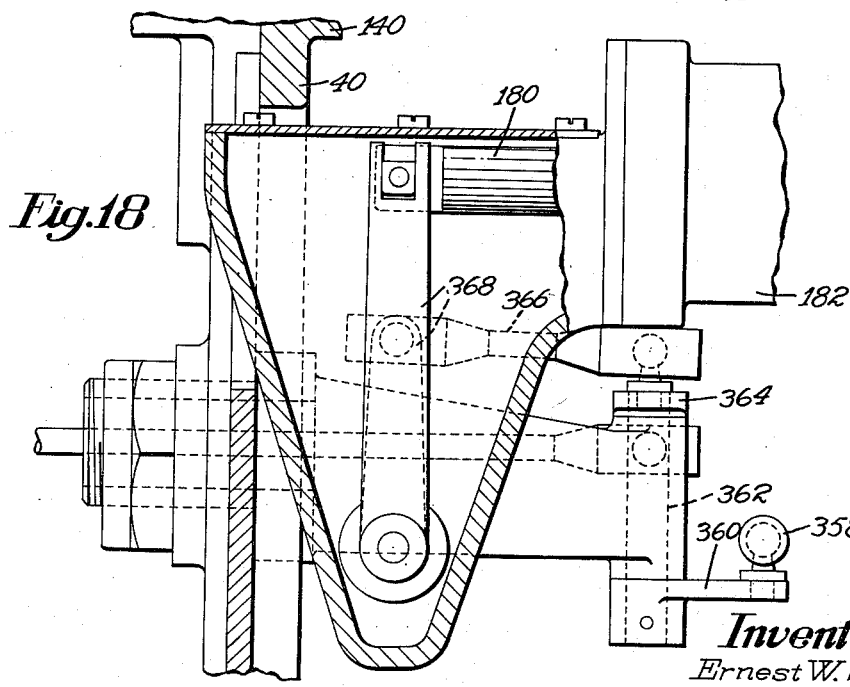

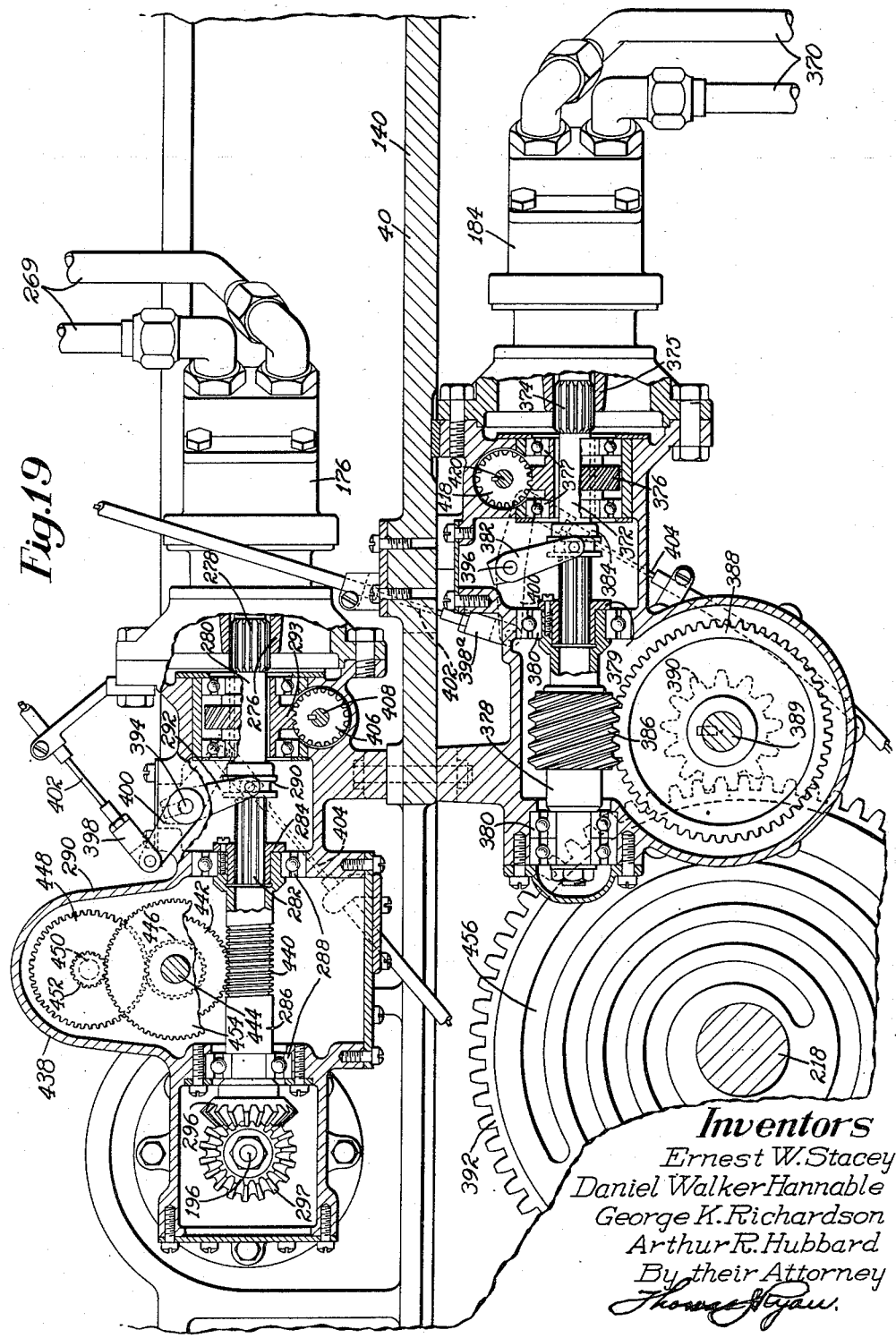

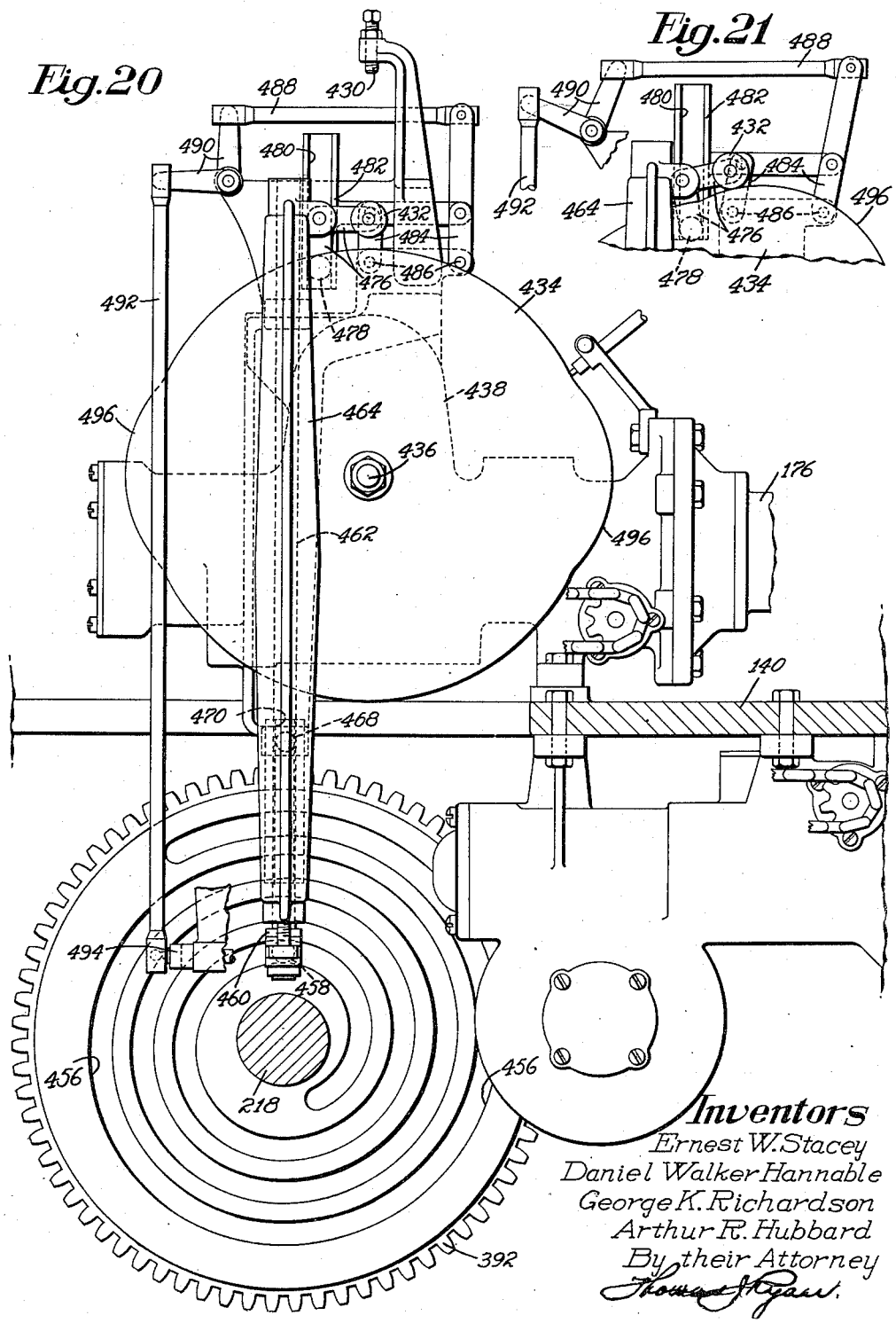

Patented Feb. 20, 1951

2,542,217

UNITED STATES PATENT OFFICE 2,542,217

ARMED MOUNT FOR AIRCRAFT

Ernest W. Stacey, Daniel Walker Hannable, and Arthur R. Hubbard, Beverly, and George K. Richardson, Wenham, Mass., assignors to United Shoe Machinery Corporation, Flemington, N. J., a corporation of New Jersey Application November 1, 1946, Serial No. 707,216

6 Claims. (Cl. 89—37.5)

This invention relates to ordnance and is illustrated as embodied in an armed mount for use in carriers such, for example, as aircraft, it being an object of the present invention to provide an improved armed mount for use in long range bombers.

With the above object in view the illustrative armed mount is provided with a pressurized turret which, when the bomber is not subject to attack by enemy aircraft, may be housed within the fuselage of the aircraft, in order to reduce wind resistance of said aircraft to a minimum, and which, whenever desirable, may be quickly and effectively projected to a firing position outside the aircraft.

The turret is mounted for pivotal movement in elevation upon an azimuth ring rotatable upon a support ring which has secured to it a plurality of ball-bearing nuts threaded onto screws rotatable in the fuselage, rotation of said screws by power-operated mechanism, causing the support ring, together with the azimuth ring and the turret, to be moved to and from its operative position, in which the turret is arranged in its projected firing position. The illustrative turret has fixedly mounted in it ammunition feeders and chargers for cannon secured to the turret, and hydraulically powered drives, controlled by grips manned by the gunner, for operating the turret in azimuth and elevation to train said cannon.

The various features of the invention including projecting and retracting means for moving the mount to and from a firing position outside the turret, improved driving means for operating the turret and stop mechanism for limiting movement of said turret in elevation will be understood and appreciated from the following description read in connection with the accompanying drawings in which, Figs. 1 and 2 are left side and rear views, respectively, of the armed mount and mechanism for moving said mount from a retracted position in a fuselage of an airplane to and from a projected firing position outside said fuselage;

Figs. 3 and 4 are elevations, partly broken away and partly in section, showing, upon an enlarged scale, portions of said mechanism for projecting and retracting the armed mount, as viewed on lines III—III, IV—IV respectively of Fig. 1;

Figs. 5, 6 and 7 are sections of the armed mount on lines V—V, VI—VI and VII—VII of Figs. 1, 5 and 6, respectively;

Fig. 8 is a plan view on line VIII—VIII of Fig. 7, showing mechanism for moving an azimuth ring upon a support ring of the mount;

Fig. 9 is a schematic view of azimuth and elevation drives for the illustrative mount;

Fig. 10 shows in side elevation azimuth and elevation fluid drive pumps;

Figs. 11 and 12 are enlarged views showing in side elevation grips used in training guns or cannon of a turret of the mount and also showing portions of drives between the grips and the azimuth and elevation fluid drive pumps;

Fig. 13 is a plan view of mechanism illustrated in Fig. 12;

Fig. 14 is a view showing portions of the azimuth drive of Fig. 12 when the grips have been displaced to move the turret in azimuth;

Figs. 15 and 16 are views in plan and elevation, respectively, partly broken away, showing portions of the azimuth drive adjacent to the azimuth fluid drive pump;

Figs. 17 and 18 are views in plan and elevation, respectively, partly broken away, showing portions of the elevation drive adjacent to the elevation fluid drive pump;

Fig. 19 shows in side elevation portions of mechanism operated by the azimuth and elevation fluid drive pumps as viewed on line XIX—XIX of Fig. 6;

Fig. 20 is a view on line XX—XX of Fig. 6 showing portions of elevation limit stop mechanism, and Fig. 21 is a view showing portions of the mechanism illustrated in Fig. 20 when the limit stop mechanism has taken over control of the movement of the turret in elevation.

Figures 5, 8:
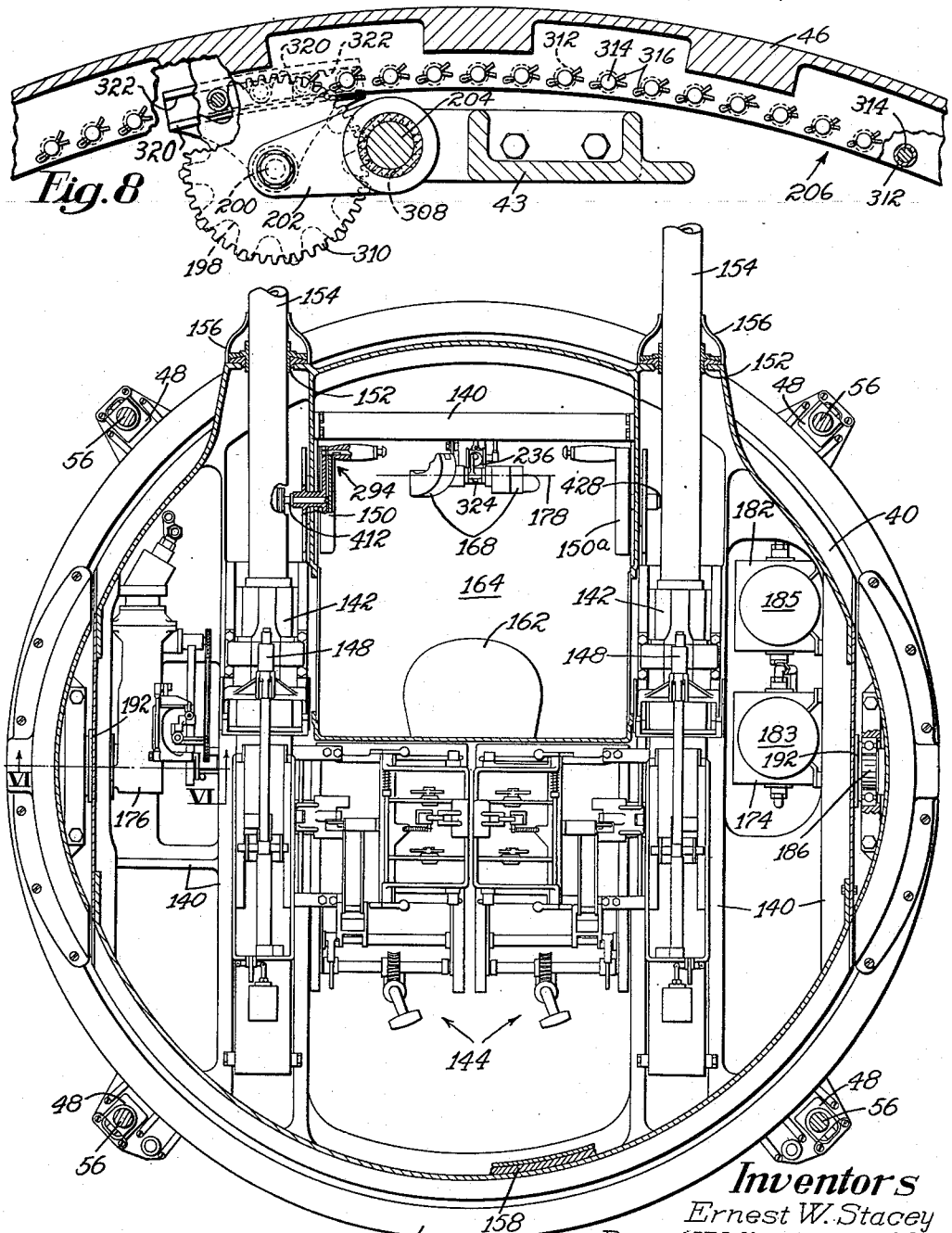

The illustrative armed mount, which comprises a turret 40, will be described as installed in the upper part of a fuselage of an airplane, portions of which are shown at 42 (Figs. 1 and 2), said turret being supported for rotation in elevation, by mechanism hereinafter described, upon an azimuth ring 43 (Figs. 1, 2, 5, 6, 7 and 8) rotatable in azimuth upon roller bearings 44 (Figs. 6 and 7) of a support ring 46. In order to move the turret 40 from an inoperative or retracted position in the fuselage to a firing, projected or protracted position outside said fuselage, the support ring 46 has welded or otherwise secured to it four base nuts 48 (Figs. 1, 2, 3 and 5) having internal helical grooves 50 (Fig. 3) for receiving balls 52 mounted in external helical grooves 54 of screws 56. The upper ends of the screws 56 are mounted for rotation in ball bearings (not shown) in housings 58 (Figs 1 and 2), 60 (Fig. 1) secured by screws 62 to the fuselage 42 and the lower ends of the screws 56 are mounted in thrust bearings 64 (Fig. 3) in housings 61, 61a (Fig. 1) secured by screws 63 to the fuselage 42. The base nuts 48 such as herein illustrated are well known in the art and need not be further described herein.

Power for moving the turret 40 to and from its firing position is supplied by a reversible electric motor 66 (Figs. 1, 2 and 4), a shaft 68 (Fig. 4) of which has secured to it a gear 70 operatively connected to a gear 72 formed integral with a sleeve 74 mounted for rotation upon a shaft 76 (Figs. 2, 3 and 4) and restrained against lengthwise movement on the shaft by a bearing bracket 78 (Figs. 2 and 4) secured to the fuselage 42. The shaft 76 is supported at its opposite ends in bearings 80 (Fig. 3) in the fuselage 42 and has secured to its opposite ends, sprockets 82 (Figs. 1, 2 and 3) which are operatively connected by chains 84 to sprockets 86 mounted at the inner ends of shafts 88 (Fig. 3) rotatably mounted in ball bearings 90 in the housings 61. The shaft 76 may be operated by mechanism, which will be described presently, through a clutch 92 (Fig. 4) splined for rotation with said shaft. Secured to each of the shafts 88 is a worm 94 (Fig. 3) which meshes with a worm gear 96 fixed to the lower end of one of the two inner screws 56. Mounted upon sprockets 98 (Figs. 1, 2 and 3) secured to the outer ends of the shafts 88 are chains 100 which are operatively connected to sprockets 102 (Fig. 1) fixed to corresponding shafts 104 in two of the housings 61a, the construction and arrangement of the above-mentioned mechanism being such that, upon rotation of the shafts 88, 104, the header screws 56, which are simiar to each other, rotate at the same speed to raise or lower the support ring 46 parallel to itself said screw.

The clutch 92 comprises a pair of friction disks 108, 110 (Fig. 4) secured to a collar 112 which is splined to the shaft 76. Engaging opposite sides of a circumferential groove of the collar 112 are a pair of rolls 114 rotatably mounted upon bifurcations of a lever 116 (Figs. 2 and 4) fulcrumed upon a pin 118 secured to the bracket 78. Counterclockwise movement of the lever 116, as viewed in Fig. 4, causes the friction disk 108 of the collar 112 to be forced against the gear 72 with the result that the shaft 76 is rotated in response to movement of said gear. Clockwise movement of the lever 116, as viewed in Fig. 4, causes the disk 110 of the collar to be forced against a stationary plate 120 secured to the bracket 78 so as to retain the shaft against rotation when the clutch is disengaged.

The lever 116, which is normally urged clockwise, as viewed in Fig. 4, by a spring 124, opposite ends of which are attached to the lever and to a frame fixed to the fuselage 42, may be moved counterclockwise against the action of said spring, to cause the turret 40 to be moved to and from its firing position, under the control of a crewman inside the fuselage or a gunner inside the turret. The gunner operates the lever 116 by pressing a button (not shown) to energize a solenoid 126 which is secured to the fuselage and a core of which is pivotally connected to the lever. The crewman operates said lever 116 by moving, through a rod 128, a roll 130 of an offset bell-crank lever 132, which is secured to a shaft 134 trunnioned on the fuselage frame, upward against the action of the spring 124 and against the action of a spring 135. In order to insure that the screws 56 shall not turn under the weight of the turret 40 and its azimuth and support rings 43, 46, there are mounted upon the shafts 88, 104, friction clutches 136 (Fig. 3) which have to be overcome by the motor drive in moving the turret to its retracted position.

The turret 40 is hydraulically powered from within and has incorporated in it, upon headers forming part of a frame 140 rigidly secured to and forming part of the turret 40, a pair of 37 mm. guns 142 (Figs. 1 and 5) to which ammunition is automatically supplied by a pair of feeders 144 (Fig. 5) which are secured in fixed relation to the guns on a girth ring forming part of the frame 140 and are fully disclosed in application for United States Letters Patent Serial No. 637,236, filed December 26, 1945, now Patent 2,494,728, in the name of Stacey et al. Cartridges are initially chambered in the guns by chargers 148 which the gunner operates manually by cranks 150, 150a (Figs. 5 and 9) and are disclosed in application for United States Letters Patent Serial No. 659,053, filed April 2, 1946, now Patent No. 2,529,822 in the name of Stacey et al. Openings 152 (Fig. 5) in the turret 40 through which barrels 154 (Figs. 1 and 5) of the guns 142 project, are closed by seal clips 156, the inside of the turret being protected against cold by insulation 158 (Fig. 5). The gunner enters the turret 40 through a door 160 (Fig. 1) and sits on a stool 162 (Fig. 5) in a compartment 164 of the turret positioned in front of the feeders 144 and between the guns 142 which are provided with suitable sights (not shown) located outside front windows 166 (Fig. 1) of the turret. Hydraulic power mechanism of the turret is controlled by grips 168 (Figs. 5, 9, 11, 12 and 13) located in the front portion of the compartment 164. Rotation of the grips 168 about a vertical axis 170 (Figs. 9, 11 and 12) causes, through mechanism hereinafter described, movement of a valve rod 172 (Figs. 9, 10, 15 and 16) to control the operation of an azimuth pump 174 which actuates an azimuth hydraulic motor 176 (Figs. 5, 9, 19 and 20) for moving the turret 40 in azimuth. Rotation of the grips 168 about a horizontal axis 178 (Figs. 5, 9, 11 and 12) causes, through mechanism which will be described later, movement of a valve rod 180 (Figs. 9, 10, 17 and 18) to control the operation of an elevation pump 182 which operates an elevation hydraulic motor 184 (Figs. 9 and 19) for driving the turret 40 in elevation about trunnions 186 (Figs. 5, 6 and 7) of said turret. The azimuth and elevation pumps 174, 182, which are of the variable displacement type and are controlled by the valve rods 172, 180 which move a wobble plate (not shown), are powered by electric motors 183, 185 (Figs. 5 and 10), respectively.

Figure 6:
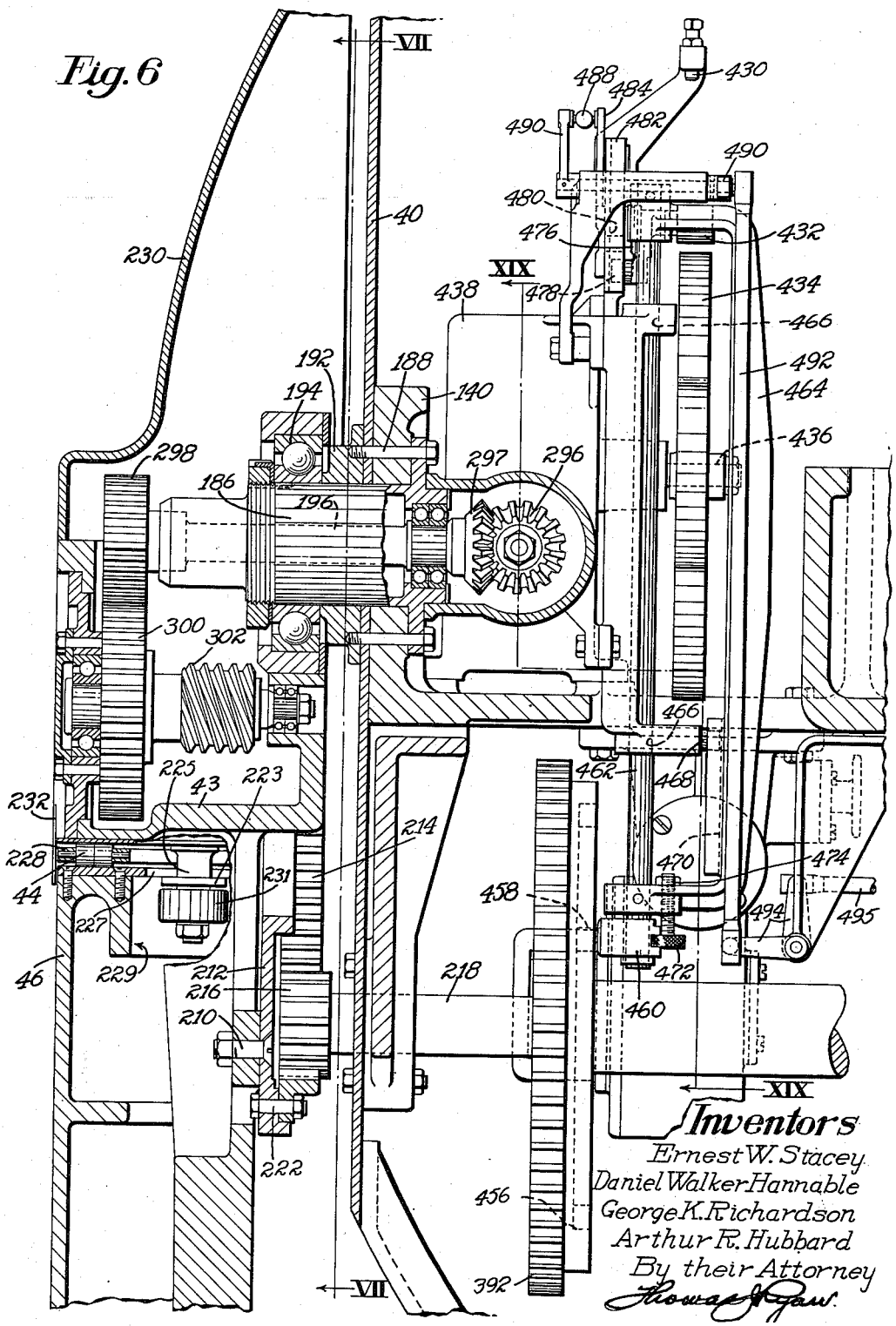

The trunnions 186 are secured by a plurality of screws 188 (Fig. 6) to end plates of the turret 40 reinforced by the frame 140 of the turret and a collar 192 (Figs. 5, 6 and 7). The trunnions 186 pass through registering openings formed in the frame 140, said end plates and the collar 192 of the turret, and are supported by ball bearings 194 (Fig. 6) mounted upon the azimuth ring 43. As will be explained later, the left trunnion 186, as viewed from the rear, is bored to receive a shaft 196 (Figs. 6 and 7) forming a portion of an azimuth drive extending outside the turret 40 and comprising a sprocket or gear 198 (Figs. 7, 8 and 9) which is mounted for rotation upon a bearing or pin 200 supported by a carrier, lever or bracket 202 pivoted upon an upstanding bearing or shaft 204 journaled for rotation in a bore of the azimuth ring 43. The sprocket 198 is at all times held in meshing engagement with a rack or ring gear 206 of the azimuth ring 43 by mechanism which will be described later. Rotation of the sprocket 198 upon movement of the grips 168 about the axis 170 from neutral position shown in Fig. 9 causes, through mechanism hereinafter described, the turret 40 to move in azimuth upon its axis 208 (Figs. 1 and 2) upon the azimuth ring 43.

Secured by bolts 210 (Figs. 6 and 7) to the azimuth ring 43 at its opposite sides are arcuate frames 212 and supported by said frames are gear segments 214 teeth of which mesh with teeth of gears 216, respectively, fixed to the opposite ends of a shaft 218 (Figs. 6, 7, 9 and 19) which is rotatably mounted in bearings of the turret frame and is driven in opposite directions by mechanism comprising the electric motor 185 and the hydraulic motor 184 in response to clockwise and counterclockwise displacement of the grips 168 from their neutral positions shown in Fig. 9, about the axis 178. The gear segments 214 are secured to the arcuate frames 212 by bolts 222 (Figs. 6 and 7) which pass through elongated arcuate recesses 224 of the gear segments 214, clamp screws 226 (Fig. 7) being provided to insure against lengthwise displacement of the gear segments from their initially adjusted positions.

The azimuth ring 43 is mounted upon the roller bearings 44 which are assembled in a circular cage 228 (Figs. 6 and 7) positioned upon the support ring 46, arcuate cover plates 230 (Figs. 1, 2 and 6) and cylindrical skirts 232 being provided to enclose turret operating mechanism extending outside the turret. The azimuth ring 43 is retained against movement away from the support ring 46 by flanges 223 (Figs. 6 and 7) of depending studs 225 bolted to the azimuth ring, said flanges underlying a plate 227 fastened by screws to the support ring 46. Rotatably mounted upon the studs 225 are rollers 231 which are constantly in engagement with a cylindrical face 229 of the support ring 46.

The mechanism for connecting the grips 168 with the valve rod 172 of the azimuth pump 174 which operates the azimuth hydraulic motor 176 will now be described. The grips 168 are secured to a shaft 234 (Figs. 11, 12 and 13) which is fulcrumed for rotation in upstanding arms of a spool 236 (Figs. 5, 9, 11, 12 and 13) and is mounted for bodily rotation about the axis 170 upon a cylindrical support 240 of the frame of the turret 40. Movement of the spool 236 in opposite directions upon the support 240 is limited by the engagement of forward projections 233 (Figs. 11, 12 and 13) of the spool with a stud 235 secured to the support. The spool 236 has at its lower end a laterally extending arm 242 operatively connected to a rod 244 which is connected, through an offset bell-crank lever 246 journaled in the turret frame, to a vertical rod 248 (Figs. 9 and 11). Pivotally connected to the vertical rod 248 is a bell-crank lever 250 which is pivoted in the turret frame, and is operatively connected through an elongated rod 252 (Figs. 9, 10, 11, 15 and 16) to a bell-crank lever 254 fulcrumed upon a vertical pin 256 secured to the turret frame. The bell-crank lever 254 has an elongated slot 257 (Figs. 15 and 16) for receiving a roll 258 carried by a lever 260 (Figs. 9, 10, 15 and 16) fulcrumed upon a vertical pin 262 secured to the turret frame, a slot 266 in said lever 260 receiving a roll 264 carried by an offset bell-crank lever 268 journaled in the turret frame, to cause sliding movement of the valve rod 172 which, as above stated, controls the operation of the variable displacement pump 174, to vary the rate and the direction of fluid from the pump 174 through pipes 269 (Figs. 9, 10 and 19) to the azimuth hydraulic motor 176. The pump 174 is operated by the electric motor 183, the arrangement being such that when the grips 168 are in their neutral positions shown in Fig. 9 oil is bypassed in the pump and when the grips are displaced about the axis 170 in one direction or the other, the flow of oil is delivered in one direction or the other through the pipes 269, the direction and the amount of the flow of fluid in said pipes varying in accordance with the displacement of the grips from their neutral positions about the axis and the direction of such displacement.

In order to insure that the grips 168 when released by the gunner shall move back to their neutral positions about the axis 170, the lever 246 (Figs. 9, 11, 12, 13 and 14) has secured to it a beam 270 constructed and arranged to be engaged by a spring-pressed plunger 272 which is slidingly supported in a housing of the turret frame and is constantly urged against said beam by a spring 274 (Figs. 12 and 14).

The azimuth motor 176 which is located at the left side of the turret 40, as viewed from the rear, outside the left gun 142, comprises an internally fluted rotor 276 (Fig. 19) normally in driving relation with a splined portion 278 (Figs. 9 and 19) of a shaft 280 which has another splined portion 282 in driving relation with an internally splined portion of a thimble 284 (Fig. 19) secured to a hollow shaft 286 mounted in bearings 288 supported in a housing of the turret frame. Secured to the shaft 280 is a circumferentially grooved collar 290 which, as will be explained later, may be moved lengthwise with the shaft by a shifter 292 to withdraw the splined portion 278 of the shaft out of driving relation with the rotor 276 and into driving relation with a spiral gear 293 which, as will appear later, is operatively connected to mechanism manually operated by the crank 150. The crank 150 serves to operate the charger of the left gun and may be thrown out of driving relation with the charger and into operative relation with the mechanism for moving the turret in azimuth, by shifting a clutch 294 (Fig. 5). The hollow shaft 286 has secured to its rear end a bevel gear 296, (Figs. 6, 9 and 19) meshing with a bevel gear 297 secured to the shaft 196 (Figs. 6 and 7) which passes through the left trunnion 186 and is operatively connected by gears 298, 300 (Figs. 6, 7 and 9) and a worm 302, all mounted for rotation in the azimuth ring 43, to a worm gear 304 (Figs. 7 and 9) secured to the upper end of the vertical shaft 204 which is also rotatably mounted in the azimuth ring and has secured to its lower end a gear 308 (Figs. 7, 8 and 9) in driving engagement with a gear 310 secured to an extension sleeve of the sprocket 198, which as above described, is pivotally mounted upon the bearing or pin 200 supported by the carrier or lever 202. The teeth of the sprocket 198 mesh with rollers 312 which are arranged in circular relation between spaced flanges of the support ring 46 and are held in place on said ring by pins 314 (Figs. 7 and 8) secured to the support ring by cotter pins 316, heads at the lower ends of the pins having mounted upon them rollers 318, the purpose of which will appear presently. The rollers 312 and the flanges of the support ring upon which the rollers are mounted serve as a rack forming part of the support ring and may be so defined. Since, as above explained, the turret 40 has to operate in temperatures which fluctuate considerably, and is mounted upon the fuselage 42, which is relatively flexible, considerable difficulty would be encountered were the azimuth ring 43 driven through a gear mounted for rotation about a fixed center in said ring. Accordingly, in the illustrative construction, the sprocket 198 is swingable together with its carrier or bracket 202 about the axis of the shaft 204, teeth of the sprocket being held in meshing engagement with the rollers 312 on the pins 314 by a cam 320 which is pivotally supported upon the pin 200 and has an arcuate groove 322 which travels along the rollers 318 as the azimuth ring 43 rotates. The sprocket 198 may be defined as being mounted for swinging movement in the general plane of the rack 206.

The mechanism for operating the elevation pump 182 (Figs. 5, 9, 10, 17 and 18) in response to rotation of the grips 168 about the axis 178 will now be described. Clamped by a screw 324 (Figs. 5, 11, 12 and 13) to the grip shaft 234 is a sleeve 326 (Figs. 9 and 13) having a forwardly projecting arm 328 operatively connected through a rod 330 with an arm 332 secured to one end of a shaft 334 rotatably mounted in the turret frame. In order to limit rotation of the sleeve 326 and, accordingly, rotation of the grips 168 in opposite directions about the axis 178, the arm 328 is provided with abutments 333 (Figs. 11 and 12) constructed and arranged to engage a stud 335 secured to the spool 236. Secured to the opposite end of the shaft 334 is an arm 336 carrying a pin 338 (Figs. 11 and 13) extending into slots 340 formed in a bifurcation of a lever 342 fulcrumed on a stud 344 secured to the turret frame.

Secured to the forward end of the lever 342 is a pin 346 which extends through elongated slots formed in bifurcations of a lever 348 secured to one end of a shaft 350 rotatably mounted in the turret frame and having secured to its opposite end a lever 352 (Figs. 9 and 11) operatively connected by a rod 354, a bell-crank lever 356, and a rod 358 to an arm 360 (Figs. 9, 17 and 18) secured to a lower end of a shaft 362 rotatably mounted in the turret frame. Secured to the upper end of the shaft 362 is a lever 364, one end of which is operatively connected through a rod 366 and a multi-armed lever 368 mounted for rotation in the turret frame, with the valve rod 186 for controlling the amount and direction of flow of fluid in pipes 370 (Figs. 9 and 10) connecting the elevation pump 182 and the elevation hydraulic motor 184.

The portion of the drive between the elevation hydraulic motor 184 (Figs. 9 and 19) and gears 216 (Figs. 6, 7 and 9), rotation of which along the gear segments 214 causes the turret to swing in elevation, is similar to corresponding parts of the azimuth drive and comprises a shaft 372 (Figs. 9 and 19) having a splined portion 374 in driving relation with a rotor 375 of the elevation hydraulic motor 184. The shaft 372 is normally rotatably supported upon splines of a gear 376, rotatable in bearings 377 (Fig. 19) mounted in a drive assembly housing secured to the turret frame, and is splined to drive an internally fluted thimble 379 screwed to a hollow shaft 378 which is rotatably supported in bearings 380 in said assembly housing. The shaft 372 may be moved to the left into the hollow shaft 378 from its position shown in Fig. 19 upon swinging clockwise a shifter 382 having pins engaging in the opposite sides of a circumferential groove in a collar 384 secured to the shaft 372, thus withdrawing the spline 374 from its driving engagement with the rotor 375 and securing it for rotation with the gear 376 which, as will be hereinafter described, is manually operated by the crank 150a (Figs. 5 and 9) mounted in the gunners' compartment. As above explained the crank 150a is also used to charge the right gun 142 but by use of a clutch (not shown) may be operatively connected through mechanism hereinafter described with the gear 376 for the purpose of manually moving the turret in elevation.

Formed upon the shaft 378 is a worm 386 in meshing arrangement with a worm gear 388 secured to one end of a shaft 389 which is rotatably mounted in the drive housing of the turret frame and has secured to its other end a gear 390 in driving relation with a large gear 392 (Figs. 6, 9, 19 and 20) secured to the shaft 218.

The circumferentially grooved collars 290, 384 (Figs. 9 and 19) through which the azimuth and elevation shafts 280, 372 are moved lengthwise into and out of operative engagement with the rotors 276, 375 of the azimuth and elevation motors 176, 184, respectively, are operated by the shifters 292, 382 mounted upon shafts 394, 396 rotatably mounted in the drive housing secured to the turret frame.

Pivotally secured through couplings 398, 398a to levers 400 fixed to the opposite ends of the shafts 394, 396 are flexible cables 402, 404 (Fig. 19) leading to the turret compartment 164 and to a compartment in the fuselage 42 respectively, the arrangement being such that the shafts 280, 372 may be selectively slid in one direction or the other by the gunner, or by a crewman located in a compartment of the fuselage, to cause the azimuth and elevation hydraulic drives, in event that they are operative, to be effective or, in case the hydraulic drive should fail, to enable the gunner manually to swing the turret in azimuth and elevation through mechanism which will now be described. Meshing with the spiral gear 293 is a spiral gear 406 (Figs. 9 and 19) secured to the outer end of a shaft 408 to the inner end of which a sprocket 410 (Fig. 9) is secured. Mounted in the frame of the turret 40 near the left wall of the compartment 164 is a shaft 412 (Figs. 5 and 9) one end of which is secured through the clutch 294 to the crank 150 and the other end of which has secured to it a sprocket 414 (Fig. 9) connected by a chain 416 to the sprocket 410. Through similar mechanism the spiral gear 376 is operatively connected to a spiral gear 418 (Figs. 9 and 19) mounted upon a shaft 420 rotatably mounted in the turret frame and having at its inner end a sprocket 422 (Fig. 9) operatively connected through a chain 424 to a sprocket 426 fixed to the outer end of a shaft 428 which is mounted for rotation in the turret frame and has secured to its inner end the crank 150a which is provided with a clutch (not shown) corresponding with the clutch 294.

The armed turret 40 when in its projected firing position outside the fuselage 42 may be rotated clockwise or counterclockwise in azimuth through an unlimited number of degrees. Movement of the turret 40 in positive elevation is limited when the guns 142 are disposed at approximately 90° to the general plane of its azimuth ring 43. Movement of the turret and, accordingly, the guns in negative elevation is limited at different degrees in accordance with the position of the guns in azimuth, the guns being depressed until their barrels 154 are in approximate engagement with the body of the fuselage 42. It will be understood that when the guns 142 are trained broadside they can be depressed more than when they are pointing somewhat forward and aft of the fuselage 42. With the foregoing in view, hereinafter described mechanism comprising a normally fixed but initially adjustable stop 430 (Figs. 6, 9 and 20), which is engaged by a roll 432, is provided to stop movement of the guns in positive elevation just before they reach 90°. A masking cam 434 is engaged by the roll 432 just before the turret 40 is moved in negative elevation to a position in which the barrels 154 of the guns 142 are likely to collide with the fuselage 42. Since the barrels 154 of the guns 142 can be moved in positive elevation to approximately 90°, for all positions in azimuth of the turret, the fixed stop 430 is used. In order, however, to insure that the field of fire of the guns 142 in negative elevation shall be as great as possible, it is necessary to provide the masking can 434, which is movable in response to movement of the turret 40 in azimuth and is shaped to enable the barrels 154 of the guns 142 to move into close proximity with the fuselage 42 before they are stopped.

The cam 434 is secured to one end of a shaft 436 which is rotatably mounted in a bearing of an azimuth drive housing 438 secured to the turret frame. In order to rotate the cam 434 degree for degree with the turret in azimuth, a worm 440 (Figs. 9 and 19) on the hollow azimuth drive shaft 286 has, in driving relation with it, a worm gear 442 secured to a shaft 444 journaled in a bearing of the azimuth drive housing 438 and having secured to its other end, a gear 446 which drives through a gear 448, a shaft 450 and a gear 452, a gear 454 secured to the cam shaft 436.

The large gear 392, which is secured to the elongated drive shaft 218, has formed in it a spiral cam groove 456 (Figs. 6, 9, 19 and 20) for receiving a follower 458 on a block 460 (Figs. 6 and 20) mounted upon a rod 462 (Figs. 6, 9 and 20) which together with a yoke 464 pinned thereto may be referred to as a slider. The cam groove 456 is so designed that the follower 458 moves equal distances radially of the gear 392 for equal degrees of rotation of said gear. The slider 462, 464 may be described as being movable equal distances in a fixed path in accordance with equal angular displacements of the turret in elevation. The rod 462 is mounted for reciprocation in alined bores 466 (Fig. 6) of the azimuth drive housing 438. In order to secure the yoke 464 against rotation about the axis of the rod 462, the housing 438 has secured to it a stud 468 (Figs. 6 and 20) which fits in a channel 470 of the yoke. The block 460 is initially secured in its proper position with relation to the yoke 464 by a screw 472 (Fig. 6) threaded into the yoke and having its head fitting in a slot of the block 460, said screw being locked in its adjusted position by a lock nut 474.

Pivoted upon the yoke 464 is a bell-crank lever 476 (Figs. 6, 9, 20 and 21) a horizontal arm of which carries the cam roll or abutment 432 and a vertical arm of which carries a pin 478 (Figs. 6, 20 and 21) fitting in a rectilinear channel 480 of a T-shaped lever 428 which is pivoted to arms 484 secured to pins 486 respectively, fulcrumed in the azimuth drive housing 438. One of the arms 484 is elongated and universally connected to a rod 488 operatively connected by an offset bell-crank lever 490 journaled in the azimuth drive housing 438 to the upper end of a rod 492. Operatively connected to the lower end of the rod 492, through an offset bell-crank lever 494 and a rod 495 is the previously mentioned lever 364 which forms part of the elevation pump controlling mechanism.

With the above-described construction it will be apparent that the cam 434 rotates in timed relation with rotation of the turret 40 in azimuth and that the rod 462 secured to the yoke 464 moves along the bores 466 of the azimuth drive housing equal distances for each degree of movement of the turret 40 in positive or negative elevation.

As above stated, the turret 40, regardless of its position in azimuth, can be moved in positive elevation until its guns 142 are disposed at approximately 90° to the general plane of the azimuth ring 43, the fixed stop 430 being engaged by the roll 432 for limiting, through mechanism above described, movement of the turret and its guns in positive elevation.

When the grips 168 have been displaced from their neutral positions shown in Fig. 9 about the axis 170, the azimuth ring 43 rotates at a fixed rate upon the support ring 46, the speed of rotation depending upon the displacement about said axis. When the grips have been displaced clockwise, as viewed in said Fig. 9, from their neutral positions about the axis 178, the turret 40 is moved at a fixed speed in negative elevation about the axis of the trunnions 186, the speed of rotation depending upon the amount of displacement about such axis.

When the guns 142 have no motion in elevation, and are pointing broadside the grips 168 being in a neutral position with respect to axis 178, the yoke 464 (Figs. 6, 9, 20 and 21) the lever 476 and its roll 432, and the cam 434 will assume the positions illustrated in Fig. 20. Should the gunner, however, move the grips 168 clockwise as viewed in Fig. 9 about the axis 178, the bellcrank lever 476 will rotate clockwise as viewed in Fig. 20 with relation to the yoke 464 which will move downward at a fixed rate. Before the guns have moved in negative elevation to a position in which they are in danger of striking the fuselage, the roll 432 will engage the cam 434, causing the lever 476 to move to its neutral position on the yoke 464, the pin 478 moving the T-shaped lever 482 to the right as viewed in Fig. 20, causing, through mechanism above described, the elevation valve rod 180 to be so actuated as to stop the flow of oil to the elevation hydraulic motor 176 and also moving the hand grips back to neutral position about the axis 178.

Assuming that the gunner should then move the grips 168 clockwise, as viewed in Fig. 9, about the axis 170, the guns if not raised in elevation would strike the fuselage. In order to guard against this, the cam 434, which is patterned to the fuselage and rotates in timed relation with rotation of the turret in azimuth, has a plurality of high portions 496 one of which engages the roll 432 before there can be any collision of the guns with the fuselage, causing the bell-crank lever 476 to be moved counterclockwise to its position shown in Fig. 21, with the result that the turret and its guns instead of stopping are further modified by moving them in positive elevation to avoid collision with said fuselage.

In like manner, when the turret 40 and its guns 142 are being moved in positive elevation, the bell-crank lever 476 will be displaced counterclockwise from its position shown in Fig. 20 and when the guns have approached close to their 90° positions in positive elevation, the roll 432 engages the fixed stop 430 causing the bell-crank lever 476 to move to its neutral position shown in Fig. 20 with relation to the yoke 464 and, therefore, the flow of oil to the elevation hydraulic motor 185 to cease.

It will be noted that the displacement of the bell-crank lever 476 and the roll 432 from their neutral or rest positions shown in Fig. 20 will vary in accordance with the displacement of the grips about the axis 178 and accordingly the speed of the turret 40 in elevation, it being clear that the faster the turret is moving in negative elevation, for example, the sooner it will engage the cam for a given position of the cam 434. With such construction it will be apparent that the turret 40 will start to stop sooner when it is moving fast than when it is moving slowly so as to relieve the severe strain which otherwise would be thrown upon the trunnions in suddenly stopping the turret.

Having described the invention, what we claim as new and desire to secure by Letters Patent of the United States is:

1. In an armed mount, a turret, power-operated means for moving the turret in azimuth and in elevation, a manually operated grip connected to said power-operated means for actuating said means, mechanism for limiting movement of the turret in positive and negative elevation, said mechanism comprising a fixed stop, a cam movable in timed relation to movement of the turret in azimuth, a slider movable in timed relation to movement of the turret in elevation, and a member which is carried by and is movable with relation to the slider and which is operatively connected to said grip and is constructed and arranged upon movement of the slider in opposite directions to engage the stop and the cam respectively to cause movement of the turret in positive and negative elevation, respectively, to cease.

2. In combination with a carrier, an armed mount comprising a turret rotatable in azimuth and in elevation on said carrier about axes respectively disposed at right angles to each other, a slider movable equal distances in a fixed path in accordance with equal angular displacements of the turret in elevation, a cam rotatable degree for degree with the turret in azimuth, power-operated rate control means for moving the turret at different speeds in elevation, manual means for effecting operation of said control means, and a member which is carried by the slider and is movable into different positions on said slider in response to the direction of movement and the amount of displacement of said rate control means, said member being constructed and arranged for movement upon the slider under the action of the cam to control said rate control means for insuring against movable parts of the mount colliding with the carrier.

3. In an armed mount, a turret, hydraulically powered means movable at variable speeds for moving the turret at variable speeds in azimuth, hydraulically powered means movable at variable speeds for moving the turret at variable speeds in elevation, a manually actuated grip which is operatively connected to said powered means and is movable in one path to control the speed of the first-named powered means to operate the turret in azimuth and is movable in a second path to control the speed of the second-named powered means to operate the turret in elevation, a fixed stop, a cam movable in timed relation to movement of the turret in azimuth, a slider movable in timed relation to movement of the turret in elevation, and a member which is operatively connected to said grip and which is movable toward and into engagement with said stop or with said cam in accordance with the direction of movement of the grip in said second path, the said member being constructed and arranged upon engagement with the stop or with the cam to cause the grip to be moved to a neutral position in said second-named path with the result that movement of the turret in positive or negative elevation ceases.

4. In combination with a carrier, a mount comprising an armed turret, powered means for moving the turret in azimuth, powered means for moving the turret in elevation, and mechanism for limiting movement of the turret in elevation, said mechanism comprising a cam movable in timed relation to movement of the turret in azimuth, a slider movable in timed relation to the movement of the turret in elevation, a lever pivoted to the slider, and means operatively connecting the lever to the second-named powered means for moving the lever with relation to the slider, said lever being constructed and arranged to engage and to be moved with relation to the slider by the cam to cause movement of the turret in elevation to be stopped or to cause the direction of movement of the turret in elevation to be reversed, thereby insuring against parts of the armed turret colliding with the carrier.

5. In combination with an aircraft, an armed turret comprising a support ring having a rack which is normally circular but is subject to deflection during the flight of the aircraft, an azimuth ring mounted for rotation on the support ring, a power drive comprising a shaft mounted for rotation on the azimuth ring, a gear fixed to said shaft, a bracket pivoted upon said shaft, a gear which is rotatably supported by the bracket and is at all times in meshing engagement with the first-named gear, a sprocket secured for rotation with the second-named gear and arranged in meshing engagement with the rack, guides mounted upon said rack, and a cam carried by said bracket and constructed and arranged to receive said guides in order to retain the sprocket in driving relation with the rack irrespective of the deflection of said rack.

6. In combination with an aircraft, an armed mount comprising a support ring having a rack which is normally circular but is subject to considerable deflection during the flight of the aircraft, said rack having a guide portion, an azimuth ring mounted for rotation on the support ring, a drive including a gear rotatable on the azimuth ring, a bracket which is carried by and is mounted for pivotal movement upon the azimuth ring, a bearing carried by said bracket, a gear which is carried by the bracket and is mounted upon said bearing and is at all times in meshing engagement with the first-named gear, a sprocket which is carried by the bracket and which is rotatable with the second-named gear and is shaped and arranged to mesh with the rack on the support ring, and an arcuate cam which is pivoted upon said bearing and has a groove constructed and arranged to engage a guide portion of said rack to retain the sprocket in meshing engagement with the rack.

ERNEST W. STACEY.
DANIEL WALKER HANNABLE.
ARTHUR R. HUBBARD.
GEORGE K. RICHARDSON.

REFERENCES CITED

The following references are of record in the file of this patent:

UNITED STATES PATENTS

| Number | Name | Date |
|---|---|---|
| 1,491,718 | Miller | Apr. 22, 1924 |
| 1,592,693 | Hall | July 13, 1926 |
| 1,651,699 | Halsey | Dec. 6, 1927 |
| 1,958,245 | Mittag et al. | May 8, 1934 |
| 1,979,011 | Potez | Oct. 30, 1934 |
| 2,370,585 | Scott et al. | Feb. 27, 1945 |
| 2,396,314 | Brown et al. | Mar. 12, 1946 |
| 2,396,529 | Phillips | Mar. 12, 1946 |
| 2,408,277 | Soenke | Sept. 24, 1946 |
| 2,408,707 | Tucker et al. | Oct. 1, 1946 |
| 2,411,114 | Rice et al. | Nov. 12, 1946 |
| 2,414,608 | Pontius | Jan. 21, 1947 |
| 2,415,967 | Pontius | Feb. 18, 1947 |
| 2,434,653 | Holschuh et al. | Jan. 20, 1948 |
| 2,434,654 | Watkins et al. | Jan. 20, 1948 |
| 2,445,765 | Dawson et al. | July 27, 1948 |
| 2,448,450 | Maxson | Aug. 31, 1948 |